United States Patent
Reesor

(10) Patent No.: US 7,295,559 B2
(45) Date of Patent: Nov. 13, 2007

(54) CLOCK SYNCHRONIZATION OVER A PACKET NETWORK USING SRTS WITHOUT A COMMON NETWORK CLOCK

(75) Inventor: Gord Reesor, Ottawa (CA)

(73) Assignee: Zarlink Semiconductor Inc., Kanata, Ontario (CA)

( * ) Notice: Subject to any disclaimer, the term of this patent is extended or adjusted under 35 U.S.C. 154(b) by 994 days.

(21) Appl. No.: 10/379,566

(22) Filed: Mar. 6, 2003

(65) Prior Publication Data

US 2003/0169776 A1    Sep. 11, 2003

(30) Foreign Application Priority Data

Mar. 7, 2002    (GB) ................... 0205350.2

(51) Int. Cl.
*H04L 12/56* (2006.01)
(52) U.S. Cl. .................. 370/395.62; 370/503
(58) Field of Classification Search .............. None
See application file for complete search history.

(56) References Cited

U.S. PATENT DOCUMENTS

| 4,144,414 A | 3/1979 | Nicholas ............... 179/15 |
| 4,317,195 A | 2/1982 | Barberis et al. |
| 4,734,900 A * | 3/1988 | Davie .................. 369/59.19 |
| 5,396,492 A * | 3/1995 | Lien ........................ 370/412 |
| 5,812,618 A | 9/1998 | Muntz et al. ............. 375/372 |
| 5,896,388 A * | 4/1999 | Earnest ................. 370/230.1 |
| 5,896,427 A | 4/1999 | Muntz et al. ............. 375/372 |
| 6,400,683 B1 * | 6/2002 | Jay et al. ................. 370/229 |
| 6,433,599 B2 | 8/2002 | Friedrich et al. |
| 6,714,548 B2 * | 3/2004 | Lauret ................. 370/395.62 |

FOREIGN PATENT DOCUMENTS

| DE | 198 42 711 A1 | 3/2000 |
| FR | 2793623 | 11/2000 |
| WO | WO99/34638 | 7/1999 |
| WO | WO 01/50674 A1 | 7/2001 |
| WO | WO 02/15449 A2 | 2/2002 |

* cited by examiner

*Primary Examiner*—Steven Nguyen
*Assistant Examiner*—Toan Nguyen
(74) *Attorney, Agent, or Firm*—Marks & Clerk; Richard J. Mitchell

(57) ABSTRACT

A method for recovering a service clock through a packet network for the provision of isochronous services uses a two-layer arrangement wherein stable oscillators are provided at the transmitting and receiving nodes. ACR is used to tune the local oscillators over a long period of time. SRTS is used to transfer the service clock except the timestamp information is based on the local oscillators at the transmitting and receiving nodes instead of the common network clock.

13 Claims, 2 Drawing Sheets

CLOCK SYNCHRONIZATION OVER A PACKET NETWORK USING SRTS WITHOUT A COMMON NETWORK CLOCK

BACKGROUND OF THE INVENTION

1. Field of the Invention

This invention relates generally to network synchronization and clock recovery, and in particular, to packet networks that transmit and receive isochronous data. More particularly, the present relates to a network node that maintains network synchronization utilizing Synchronous Residual Time Stamp (SRTS), where reference timing is derived from local clocks available at the source and destination nodes as opposed to a common end to end network clock.

2. Description of Related Art

Packet networks are convenient for transferring time insensitive data, such as computer files, between remote nodes. When it is desired to send time-sensitive or isochronous data, such as voice and video, over a packet network, some means must be found to transport the service clock, namely the clock that originates with the isochronous service, over the network. The characteristics of this clock as well as the accompanying isochronous data should be transported over the network without actually sending the clock signal itself.

The packet network uses a common reference clock, known as the network clock, to clock the data over the packet network. Sometimes, but not always, the network clock is made available to the source and destination nodes.

Each node generates a local clock with a digitally controllable frequency. This is used to regenerate the service clock at the receiving node.

The transfer of isochronous voice and video data over a packet network between nodes requires that the node clocks be synchronized so as to prevent data loss due to slips. A slip can be defined as an overflow or underflow of data buffers, which are typically designed to absorb jitter and wander (low frequency clock variation). Slips in video signals degrade visual performance, and it is thus important to reconstruct the source synchronization with high accuracy. Clock slips in digital voice connections cause clicks and pops that degrade audio performance. The accumulation of jitter and wander in voice networks must be controlled in order to ensure a high quality of service. The required accuracy of a recovered clock at the slave end of a packet network may depend upon the requirements of the rest of the network that this clock has to synchronize.

Several methods exist for the transport of clock information over packet networks, as a means to provide synchronized clocking at either end of the network for isochronous services (e.g. voice and video). The most notable methods are the Plesiochronous mode, Synchronous Residual Time Stamp (SRTS) (or variant RTS method), or the Adaptive Clock Receiver (ACR) method. The SRTS method is generally preferred when a common end to end network clock is available, and the ACR method is often alternatively chosen when a common network clock is not available. The Plesiochronous mode may be used when a traceable stratem-1 clock source is available at both ends of the network, for example when a GPS clock is available. Both SRTS and ACR methods are used extensively in ATM networks, the ACR method being used more and more due to the lack of a synchronized end to end network clock. Both methods may also be used for other types of packet networks e.g. IP networks with Ethernet layer 2, although the synchronous network clock is rarely available with Ethernet.

Prior art clock recovery methods appear to use one of the above methods, or may select one of them at any given time as needed.

In the SRTS method, timing information is carried through the network with the data transmission. The destination node uses this timing information to recover the frequency of the source node service clock, which determines the frequency of the destination node service clock. SRTS must have a common clock available at both ends of the packet network. The SRTS method is based on the coding of the frequency difference between the service clock and a network reference clock into a Residual Time Stamp. This Residual Time Stamp is coded inside the packet headers, and transported to the other side of the network. The same frequency difference is reproduced on the other side of the network, reproducing the service clock at the receive node.

ACR provides the recovery of the master side clock frequency at the slave node without the use of a common network clock. The distribution of a common network clock is not usually possible in Ethernet networks for example.

The ACR method is generally based on the fill level of a buffer receiving the incoming data traffic. The local frequency is adjusted so as to keep the fill level of the buffer at a more or less constant level (e.g. half full). Other methods of ACR have also been published where the long term average of inter-packet timestamp arrival times is averaged, compared with locally generated timestamps, and filtered to provide an error correction control to the frequency of the local oscillator.

SRTS has the advantage that it generally provides a higher accuracy of clock recovery than does ACR. SRTS does not rely on statistics of the cell or packet jitter except that it has a known, bounded amplitude. Therefore, the recovered clock has the capability of a high degree of frequency stability unaffected by cell or packet delay variation, and it is capable of transferring the wander characteristics of the service clock (which is important).

A drawback to the SRTS clock recovery method is that it assumes that a common network reference clock is provided to the source and destination nodes. A common network reference clock is often not available for several reasons. Each portion of the network may be a separate timing domain, and would therefore be synchronized to a different reference clock. Multiple interconnected ATM networks are an example, because the separate ATM networks will not use the same clock. IP networks that use Ethernet are another (more extreme) example, where each network hop may use a different physical clock, the difference in timing being compensated by the insertion of inter-frame idle data. A loss of synchronization could occur, and in this case the network will continue to operate using a holdover clock sourced locally within a network node, i.e. not traceable to a PRS.

ACR has the advantage that it does not need a common network clock, but it has the disadvantage that it must attempt to filter out the statistics of packet delay variation. This requires a phase locked loop with a loop filter with very low cut-off frequency. There is a trade-off between filter time constant (which affects convergence time), and wander performance. It is often necessary to transfer the wander characteristics of the service clock rather than attempt to filter it out. ACR can actually add large amounts of wander to the transported service clock, due to changing network packet delay variation statistics.

The following U.S. Pat. Nos. relate generally to such prior art SRTS and ACR systems: 5,260,978; 6,122,337; 5,742,649; 5,896,427; 5,396,492; 6,157,646; 5,812,618; 6,026, 074; 6,144,714; 6,167,048; 5,822,383; 6,044,092; 5,912,880; 5,740,173; 5,825,750; 6,046,645; 6,111,878; 6,137,778; 6,144,674; 6,195,353; 6,011,823; 5,608,731; 5,896,388; 6,108,336.

A full description of SRTS can be found in Synchronous Residual Time Stamp (SRTS), as described in ITU-T I.363.1 B-ISDN ATM Adaptation Layer specification: Type 1 AAL. Pages 13-16, the contents of which are herein incorporated by reference.

SUMMARY OF THE INVENTION

According to the present invention there is provided a method for recovering a service clock through a packet network for the provision of isochronous services, comprising providing first and second stable local oscillators at respective transmitting and receiving nodes; generating first timing information for said first stable local oscillator; transferring first said timing information between said transmitting and receiving nodes over the packet network based on long-term averaging of the frequency difference between said first and second stable local oscillators; using said first timing information to control the second stable local oscillator; generating second timing information relating said service clock to said first stable local oscillator; and recovering said service clock at the receiving node from said second timing information and said second stable local oscillator.

This invention employs a two-layer system of clock recovery. In a preferred embodiment, the first layer consists of local oscillators at the network nodes with a relatively high degree of frequency stability (relative to the service clock), along with an ACR method to tune the local oscillator at the slave side to the same frequency as the master side. The apparatus may include a digitally controllable local oscillator, the frequency of which is tuned, for example, by using the ACR method that measures the difference between the local frequency and a long-term average frequency of timestamp (TS) inter-packet arrival times. Many other methods for this are well known to those skilled in the art.

The second layer consists of an SRTS clock recovery apparatus and method, but without the use of a common end to end network clock. Instead of the network clock, the high stability local clock, previously described as the first layer clock is used. The degree of performance of the recovered service clock relative to the source service clock is dependent upon the long-term stability of the local clock, and the corresponding period of time available to an ACR algorithm to resolve the frequency difference of the local oscillators.

By using a combination of SRTS and the ACR at the same time, the need for a common network clock (required for SRTS) can be eliminated.

BRIEF DESCRIPTION OF THE DRAWINGS

The invention will now be described in more detail, by way of example only, with reference to the accompanying drawings, in which.

DETAILED DESCRIPTION OF THE PREFERRED EMBODIMENTS

Figure 1:
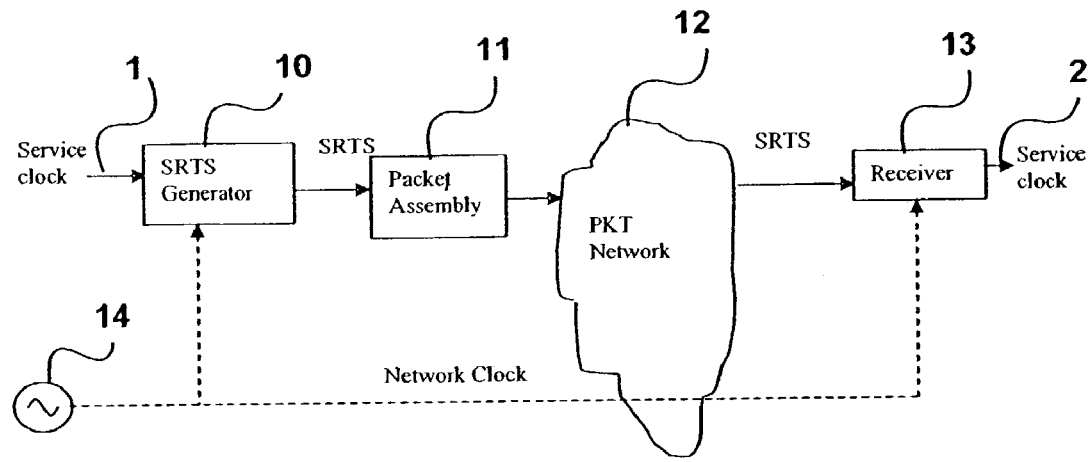
FIG. 1 is a prior art block diagram of an apparatus for SRTS.

Referring to FIG. 1, in a typical isochronous application, a service clock 1 for voice or video data to be transferred across packet network 12 is fed into SRTS generator 10, which produces an SRTS timestamp that is fed to packet assembly unit 11. The SRTS timestamp is transferred across the packet network 12 to receiver 13, where it is extracted and used to generate local service clock 2, which reproduces the transmitting clock 1.

Data is clocked across the packet network by network clock 14, which is made available to the transmitting and receiving nodes. As noted above, the disadvantage of this arrangement is that the network clock 14 must be available to both nodes in order for the receiver to recover the source timing information.

Figure 2:
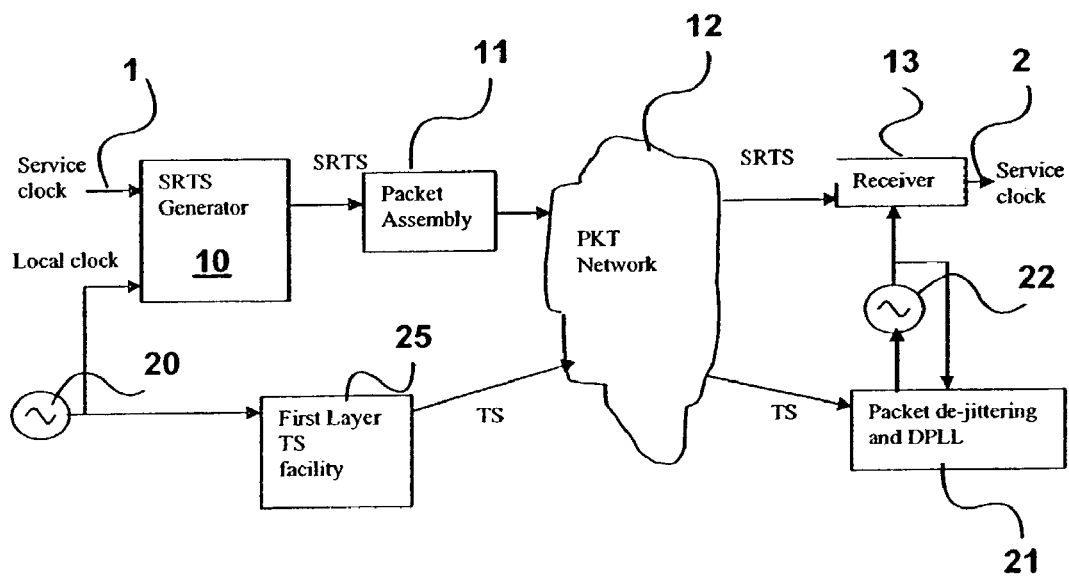
FIG. 2 is a block diagram of an enhanced SRTS with local clock oscillators in accordance with an embodiment of the invention.

FIG. 2 is a block diagram of an enhanced SRTS system in accordance with an embodiment of the invention. An SRTS approach is used as described with reference to FIG. 1, except instead of employing a common network clock stable local oscillators are employed.

On the transmitting side local oscillator 20 with a high degree of stability relative to the service clock generates a "local" clock signal, which is input to the SRTS generator 10. This produces an SRTS timestamp based on the local clock signal.

First layer unit 21 then produces timestamp packets TS in first layer timestamp facility 25, which are sent through the network 12 to packet de-jittering and double phase locked loop unit 21, which controls a digitally controllable local oscillator 22 on the receiving side. The local oscillator 22 is tuned, for example, by using the ACR method, which measures the difference between the local frequency and a long-term average frequency of the timestamp inter-packet arrival times. One skilled in the art will appreciate that many known techniques can be employed for this purpose.

The second layer the SRTS clock recovery apparatus, which uses the high stability local clock 20 to generate the SRTS timestamp in SRTS unit 10.

At the receiving node, the receiver 13 uses the regenerated local clock 22, instead of the network clock, to recover the service clock 2 from the received SRTS timestamp. The degree of performance of the recovered service clock relative to the source service clock is dependent upon the long-term stability of the local clock, and the corresponding period of time available to an ACR algorithm to resolve the frequency difference of the local oscillators 20 and 22.

Figure 3:
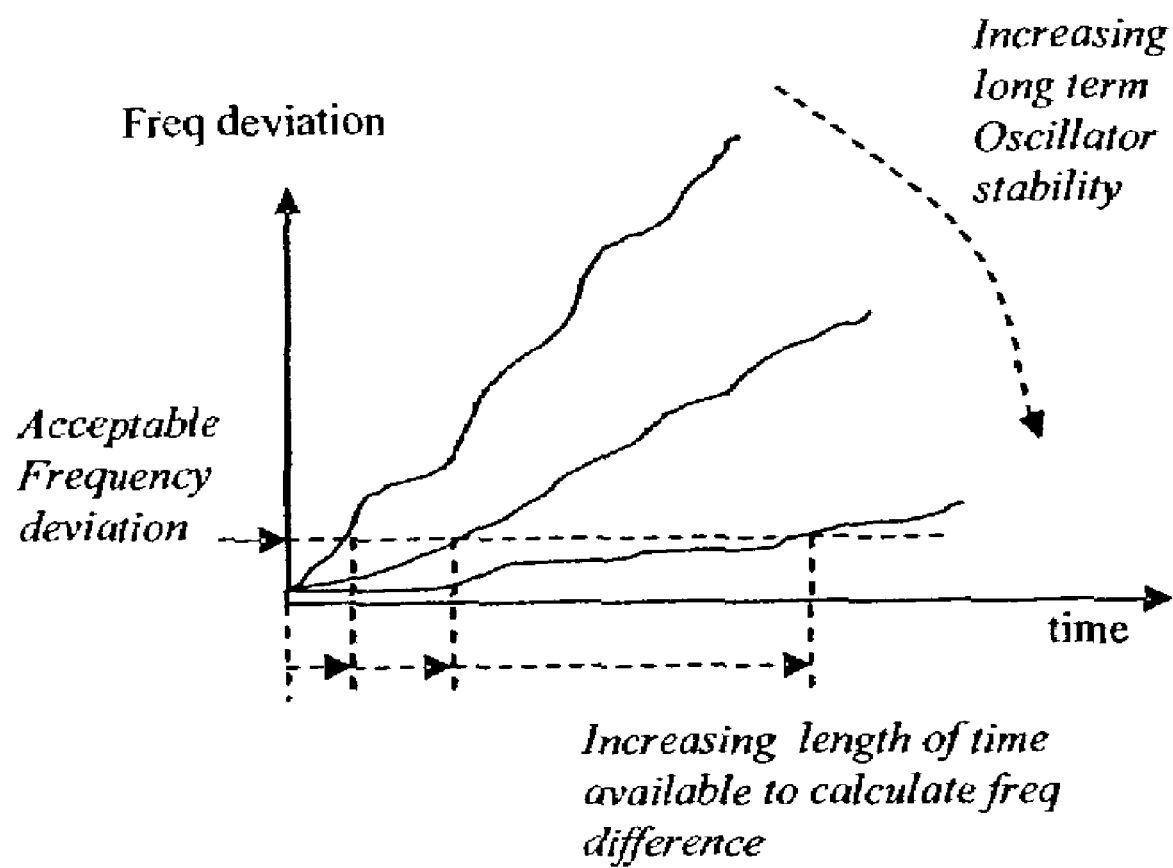
FIG. 3 is a graph showing the relationship between stability of local oscillators and frequency deviation Vs length of time available to determine frequency difference between local oscillators.

FIG. 3 shows the relationship between frequency deviation and length of time available to the ACR algorithm vs. long-term stability of the local oscillator. The long term oscillator stability increases with increasing length of time available to calculate the frequency difference between the local oscillators.

In accordance with the invention, the high stability local oscillators are in effect frequency "disciplined" by the ACR method, based upon long term averaging of the frequency difference between the network nodes. As an example, where a highly stable Rubidium or Cesium local clock is available, the initial frequency difference between the local clocks of the network nodes would be very small by design. The "disciplinary" action to tune the frequency of the slave oscillator would only be done after long periods of measuring time to determine and remove frequency difference between the oscillators. In the limit, this becomes similar to the case where a common network clock is available to the network nodes.

It is important to appreciate that this two layer method in accordance with the invention provides the ability to transfer wander and phase change information inherent in the source service clock with a high level of performance. The first layer may use long time constants for the determination of frequency difference or for a PLL loop filter. The second layer can therefore use a method such as SRTS, which is capable of transferring short-term characteristics of the service clock without dependence upon network delay variation statistics.

Given that the frequency stability of the local oscillators can be chosen by design, it should therefore be possible to determine the level of performance of the recovered service clock as a function of the stability (and therefore cost) of the local oscillators.

While for convenience the invention has been described in terms of a transmitting and receiving node, it will of course be realized by one skilled in the art that the nodes are bi-directional. Either node can act as the transmitting or receiving node.

It will be appreciated by one skilled in the art that many variants of the invention as described are possible within the scope of the appended claims.

The invention claimed is:

1. A method for recovering a service clock through a packet network for the provision of isochronous services, comprising:
   providing first and second stable local oscillators at respective transmitting and receiving nodes;
   generating first timing information about said first stable local oscillator;
   transferring said first timing information from said transmitting node to said receiving node over the packet network without reference to a common network clock;
   using said first timing information received at the receiving node to control the second stable local oscillator based on long term averaging of the frequency difference between the first and second stable oscillators;
   generating second timing information relating said service clock to said first stable local oscillator at said transmitting node using said first stable local oscillator as a reference for said second timing information at the transmitting node;
   transferring said second timing information from said transmitting node to said receiving node; and
   recovering said service clock at the receiving node from said second timing information and said second stable local oscillator using said second stable oscillator as a reference for said second timing information at the receiving node.

2. The method as claimed in claim 1, wherein said first timing information is transferred using an adaptive clock recovery (ACR) technique.

3. The method as claimed in claim 2, wherein said second timing information is encoded using a synchronous residual time stamp timestamp based on said first local oscillator and recovered using said second local oscillator without reference to a common network clock.

4. The method as claimed in claim 3, wherein timestamp packets are generated at the transmitting node based on the first local oscillator and transferred over the network to the receiving node, and the receiving node recovers the first timing information to control the second stable oscillator from the long-term average of the timestamp packet inter-packet arrival times.

5. The method as claimed in claim 4, wherein said timestamp packets are received by a de-jittering and double phase locked loop unit that control said second local oscillator.

6. The method as claimed in claim 5, wherein said second stable local oscillator is a digitally controlled local oscillator.

7. The method of claim 1, wherein said first and second timing information are transferred in the same direction.

8. A clock recovery system for isochronous services in a packet network, wherein a service clock at a transmitting node is recovered through the packet network, comprising:
   first and second stable local oscillators at respective transmitting and receiving nodes;
   a first timing transfer layer for transferring first timing information between said transmitting and receiving nodes without the use of a common network clock for synchronizing said first and second local oscillators based on long-term averaging of the frequency difference between said first and second stable local oscillators; and
   a second timing transfer layer for transferring second timing information between said transmitting and receiving nodes by sending said second timing information relating the service clock at the transmitting node using the first stable local oscillator as a reference for said second timing information at the transmitting node and recovering said service clock at the receiving node from said second timing information and said second stable oscillator using said second stable oscillator as a reference for said second timing information at the receiving node.

9. The clock recovery system as claimed in claim 8, wherein said first layer employs an adaptive clock recovery technique to synchronize said first and second local oscillators.

10. The clock recovery system as claimed in claim 9, wherein said first timing transfer layer comprises a timestamp unit at the transmitting node for generating timestamp packets for said first stable local oscillator, and a second timing recovery unit at said receiving node for recovering timing information from the long-term average of the timestamp packet inter-packet arrival times.

11. The clock recovery system as claimed in claim 10, wherein said second timing transfer layer uses synchronous residual time stamp timestamps, and said synchronous residual timestamps are created at the transmitting node with reference to said first stable oscillator and recovered at said receiving node with reference to said second stable oscillator without the use of a common network clock.

12. The clock recovery system as claimed in claim 11, wherein first and second oscillators are selected from the group consisting of rubidium and cesium oscillators.

13. The clock recovery system of claim 8, wherein said first and second timing information are transferred in the same direction.

* * * * *